United States Patent Office 3,366,773
Patented Jan. 30, 1968

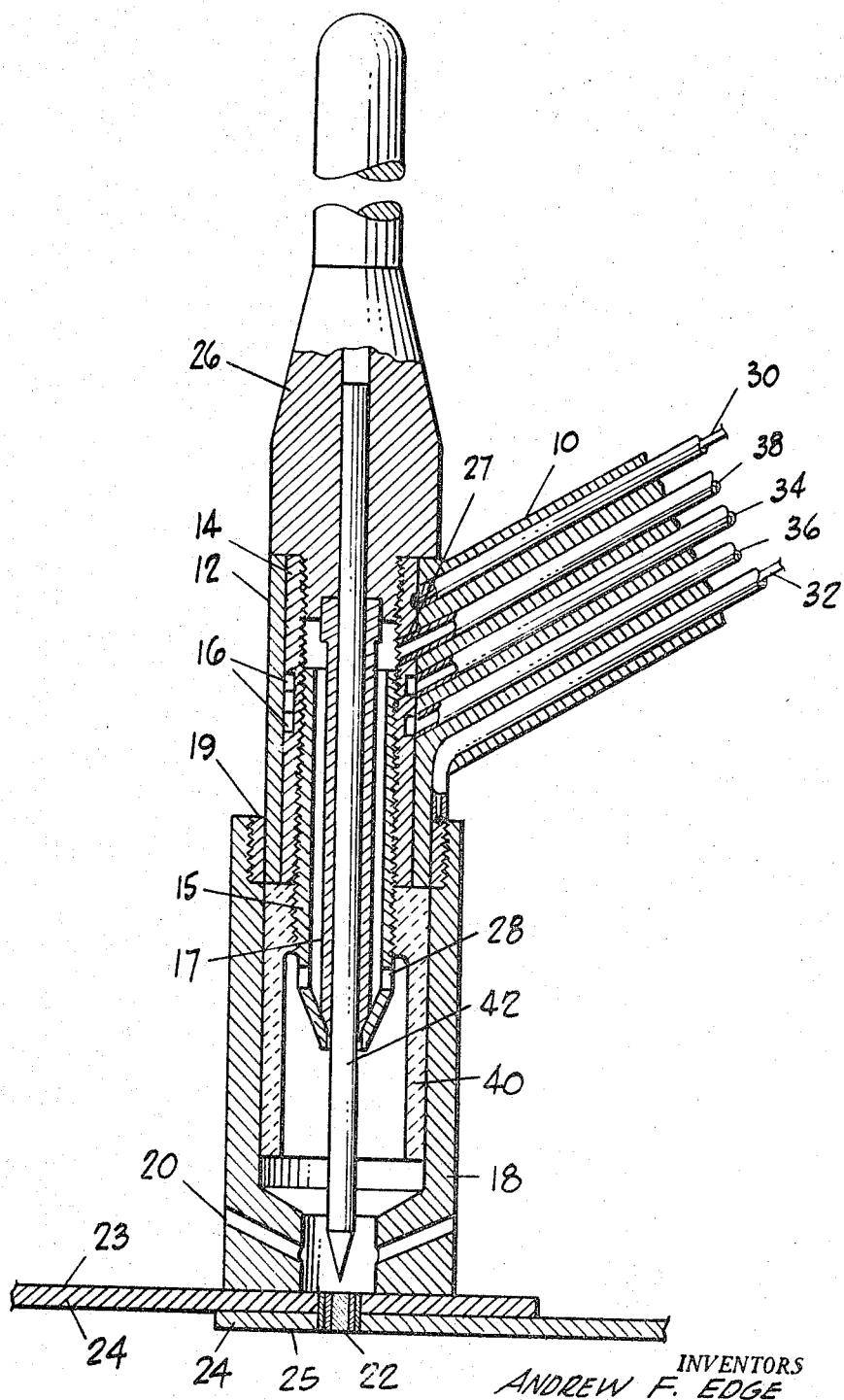

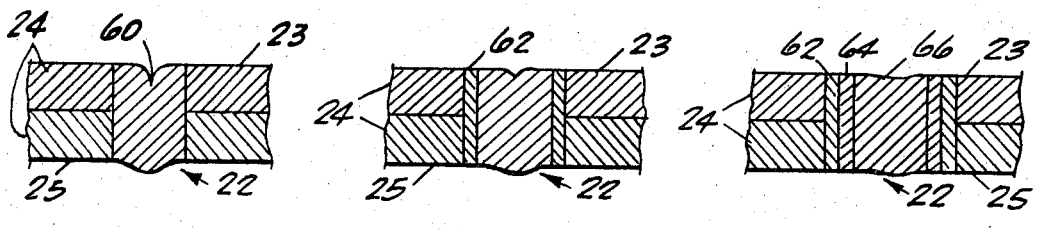
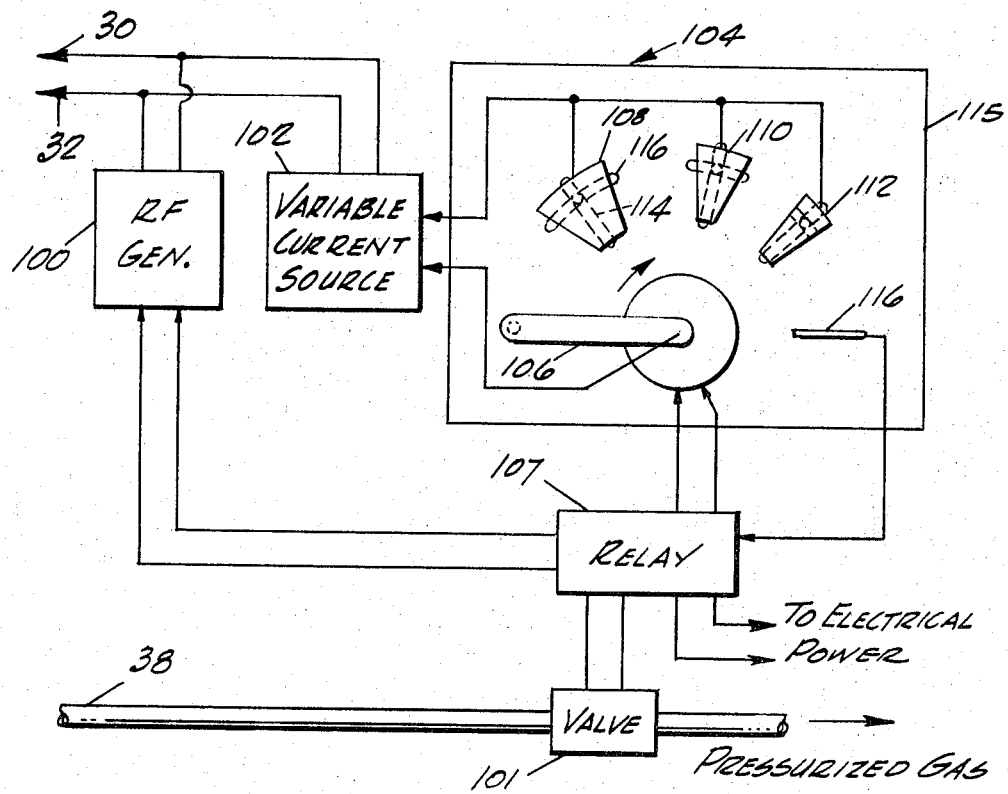

3,366,773
PORTABLE SPOT WELDER AND METHOD
Andrew F. Edge, Long Beach, and Samuel A. Nivison, Redondo Beach, Calif., assignors, by mesne assignments, to McDonnell Douglas Corporation, Santa Monica, Calif., a corporation of Maryland
Filed Sept. 6, 1963, Ser. No. 307,159
7 Claims. (Cl. 219—127)

ABSTRACT OF THE DISCLOSURE

A shielded arc spot welding method and apparatus wherein a plurality of progressively shorter duration periods of current flow and a circumferential heat sink provide cylindrical weld nuggets of diminishing size, thereby overcoming hot cracking, and increasing weld strength, quality and reliability. A circumferential heat sink causes the outer portion of the weld to solidify and cool first. Successive heating for progressively shorter duration periods of current flow reduces the size of the weld puddle so that tensile or shrinkage stresses at the center are eliminated. Electrical apparatus provides timed cycles of welding and cooling.

---

Shielded arc spot welding is generally applied to join two overlapping sheets. Arc heat is applied on one external side of the sheets by striking an arc between an electrode and the sheet, in order to form a molten weld puddle which extends through both sheets. When the heat is removed, the puddle solidifies into a conventional spot weld nugget, and the adjacent sheet surfaces are fused together throughout the area of this nugget.

One difficulty often encountered in the use of the shielded arc weld process is that weld nuggets may be produced that are conical in shape, becoming very small in diameter on the side opposite the torch or back side of the two sheets. This is caused by the fact that the arc is struck on the front or torch side and insufficient heat is conducted to the back side to melt a large diameter of metal and form a uniformly large weld nugget. If a greater amount of heat is applied to the torch side as by continuing the arc for a longer period of time, thermal stresses set up in the adjoining areas of sheet metal cause dimensional changes and warpage therein. Additionally, the diameter of the torch side of the weld nugget may be larger than allowable where the area in which a spot weld is to be made is restricted.

Another difficulty encountered with present shielded arc spot welding equipment and techniques is that the spot weld nugget often develops cracks and craters in its center, which decrease the weld strength, quality and reliability. This phenomenon, commonly referred to as hot cracking of the weld metal, is thought to be due primarily to the fact that the outer portions of a weld nugget solidify first and, in solidifying, undergo contraction. As the inner portion of the molten weld nugget solidifies, it adheres to and becomes homogeneous with the previously solidified outer portions. Inasmuch as the metal contracts during cooling, the molten inner portions are drawn to the outer portions, and tensile or shrinkage stresses are established at the center of the nugget from which area metal is drawn.

During the early phases of solidification, shrinkage stresses are of relatively small magnitude because the molten center is unable to apply restraining forces to oppose the shifting of metal in a radially outward direction. During the final stages of solidification, all of the center nugget area is at least partially solidified. The center area is thus able to supply restraining forces against radially outward shifting of metal, in addition to pulling the metal inwardly toward itself as it contracts. This results in the creation of high shrinkage stresses. Inasmuch as the center portion is near its solidus temperature or melting point, the metal is very weak and the shrinkage or tensile stresses are relieved by the physical tearing or rupturing of the metal at the center of the nugget.

Welds are often made by methods which employ an uninterrupted cooling rate, and sometimes by methods which employ a controlled decay of welding current to delay or reduce the cooling rate. It can be appreciated from the foregoing discussion that each of these approaches results in the progressive accumulation of shrinkage stresses as the metal solidifies, and in the occurrence of hot cracking.

The present invention provides a shielded arc spot welding method and apparatus which eliminates much of the difficulties encountered with prior methods and apparatus. In this invention, an essentially cylindrical rather than conical weld nugget is formed by providing a heat sink on the surface to which the arc is applied and immediately surrounding the nugget. The provision of a heat sink allows for the application of great welding heat without causing a nugget of very large diameter on the forward sheet where the heat is applied. Since heat is drawn away only from the top surface of the sheets being welded, the weld nugget is of large size on the back or opposite side. This combination of actions results in a weld nugget of fairly uniform diameter throughout the thickness of both pieces of material. The heat sink is essentially a heat conducting tube disposed about the welding head, which contacts the work and is used to apply pressure to maintain the two sheets of material to be welded in tight contact with each other. The tube also serves as an electrical conductor to conduct current to the sheets and enable the establishment of an arc between an electrode and the sheets to be welded, and additionally, as a gas confining cup to confine inert gas to the area of the arc. Although the tube includes gas ports to allow for the exit of gas, these ports are spaced from the end of the tube which contacts the sheets, thereby assuring a 360° heat sink with no hiatuses, and assuring a uniform weld nugget.

To prevent the accumulation of shrinkage stresses and the consequent formation of craters and cracks at the center of the weld nugget, the present invention provides for a sequence of timed, variable heat and cool cycles or periods. A first cycle of heating is applied to obtain the molten nugget which serves to weld the two sheets together. Before more than a ring of nugget solidifies, an arc is again struck which melts a large central portion of the nugget. A short period of cooling allows for the solidifying of another ring of nugget, and only small stresses are thus created. Finally, an arc is struck for a third time which melts only the very center of the nugget, resulting in the solidification of this center portion only and producing a relatively small diameter nugget with a minimum of hot cracking and accompanying stresses.

Accordingly, one object of the present invention is to provide a shielded arc welding method and apparatus which produces a weld nugget having a large diameter on the side opposite the torch.

Another object of the present invention is to provide a shielded arc welding method and apparatus wherein a nugget essentially free from cracks and craters is obtained.

Another object of the present invention is to provide a shielded arc welding method and apparatus wherein weld nuggets of uniformly high quality are obtained.

Another object of the present invention is to provide a shielded arc welding method and apparatus wherein weld nuggets of uniformly high quality are obtained.

Another object of the present invention is to provide a shielded arc welding method and apparatus wherein welds of high strength are obtained with a minimum of stress being established in the material adjacent the weld.

Still another object of the invention is to provide an improved portable spot welding apparatus that is efficient in operation, reliable in use and relatively economical.

Other and further important objects of the invention will become apparent from the disclosures in the following detailed specification, appended claims and accompanying drawings, wherein:

FIGURE 1 is a side elevational, partially sectional view of a welding torch as employed in one embodiment of the present invention;

FIG. 2 is an enlarged, fragmentary, sectional view of a preliminary weld nugget as formed by the welding equipment of the present invention after the application of only the first of three heating cycles;

FIG. 3 is a sectional view of an intermediate weld nugget as it appears after the second cycle of heating and cooling;

FIG. 4 is a sectional view of a final weld nugget as formed by the equipment of the present invention after all three cycles of heating and cooling are completed; and FIG. 5 is a simplified partially diagrammatic view of one embodiment of a current source which may be used in connection with the apparatus and method of the present invention.

With reference to the drawings wherein like parts are identified by like reference numerals, apparatus of the present invention comprises a housing 12 from which is depended a handle 10 integral therewith and serving to enable the positioning of the spot welder of the invention against one surface of a pair of workpieces 24. The handle 10 encloses tubes and electrical leads for carrying the power, purge gases and cooling water needed for the operation of the spot welder.

The housing 12 is a non-conductive material such as a high-temperature resistant plastic. A metallic bushing 14 disposed within the housing enables the fastening together of various parts of the spot welder. The bushing includes two grooves 16 which are covered by the inner wall of the housing 12, thereby forming a water jacket for carrying cooling water which is conducted through inlet conduit 34 and outlet conduit 36. Cooling water is needed to carry away the large heat produced by welding, which would otherwise make the equipment too hot to hold and possibly melt some parts thereof.

The inner wall of the bushing 14 is threaded to enable the receiving therein of a chuck for holding a welding electrode 42. The chuck comprises a collet body 15 threaded into the bushing 14 and a split collet 17 within the collet body. One end of the split collet 17 is tapered so that it fits within a short taper formed within one end of the collet body 15. A cap 26 which screws into the bushing 14, is adapted for pressing against one enlarged end of the split collet 17 opposite the tapered end, thereby wedging the tapered end of the split collet into the collet body. When the tapered end of the split collet is wedged into the collet body, the split collet sections are forced together and grip the electrode 42.

A bushing 40 of ceramic or other suitable high temperature resistant, electrically insulating material is threadably joined to the outside of the collet 15. The bushing 40 insulates the collet body 15 and electrode 42 from the rest of the assembly. A bushing 19 of an electrically conductive material is mounted on the periphery of the housing 12. Threadably mounted on the bushing 19 is a cup 18 of a thermally and electrically conducting material such as, for example, copper or the like. The cup 18 serves as a heat sink to carry away welding heat from the workpieces 24 and as an electrical conductor for conducting current to the workpieces 24 to enable the establishment of an arc between the electrode 42 and the workpieces.

Electrical leads 30 and 32 are provided to conduct current to the electrode 42 and the cup 18. One lead 30 is electrically connected to the bushing 14 which makes electrical contact with the collet body 15. Current is conducted from the collet body 15 to the split collet 17 and thence to the electrode 42. The other lead 32 is electrically connected to the bushing 19 which contacts the cup 18. When the cup 18 is held against a workpiece to be welded, it makes electrical contact therewith and enables the establishment of an arc between the workpiece and the tip of the electrode 42.

The production of a satisfactory weld generally requires the provision of an inert atmosphere around the weld area. Such an inert atmosphere is obtained herein by carrying a suitable inert gas such as argon or helium through the gas inlet tube 38 to the torch assembly. The tube 38 leads to an aperture 27 in the bushing 14. The aperture is located between the spaced ends of the cap 26 and collet body 15 so that gas can flow through the space between the split collet 17 and collet body 15, thence through holes 28 in the collet body and into the area immediately surrounding the weld. In order to displace air from the weld area and substitute inert gas therefor, ports 20 are provided in the cup 18. The flow of inert gas causes the exhaustion of air overlying the weld area, through the ports 20, thus purging the weld area. A continuous flow of inert gas maintains the desired atmosphere in the weld area.

In order to employ the spot welder to weld two pieces of material together, the welding assembly is positioned above the workpieces 24 with the free end of the copper cup 18 against the workpieces. Pressure is applied to the torch in order to produce intimate contact between the cup 18 and the surface 23 of one of the workpieces 24 and hold the workpieces tightly together. Next, a relay 107 as shown in FIG. 5 is closed to operate a timer 104 which controls the cycle of welding current flow, a radio frequency generator 100, and a valve 101 which controls the flow of gas through the tube 38, all in a manner to be described hereinafter.

The closing of the relay 107 causes the activation of the electrical power and gas supplies and the commencement of the welding cycle. The welding cycle begins with a purge, wherein inert gases are forced through the gas inlet tube 38 and passageways in the torch described hereinbefore, and out through ports 20, to displace air from the weld area and establish an inert atmosphere thereover.

The next step in the present welding process is the establishment of an arc for a predetermined period in order to obtain a weld nugget. Current to supply the arc is carried through the leads 30 and 32 which enable the establishment of a potential between the electrode 42 and the workpieces 24 to maintain an arc therebetween. An arc may be initiated by maintaining a high frequency field between the electrode 42 and the workpieces 24 whereby the gas between them becomes ionized and becomes an electrical conductor. This high frequency current is transmitted through the same leads 30 and 32 which are connected to the electrode 42 and cup 18 respectively. Upon the establishment of an arc great heat is applied to the workpieces 24, causing a local area to melt and form a weld nugget 22. This nugget has an essentially constant diameter throughout the depths of the workpiece 24 because, although heat is applied to the upper sheet surface 23, heat is also withdrawn from the upper sheet surface in an area around the weld by the copper cup 18 thereby assuring a weld nugget of limited diameter at the upper sheet surface 23.

If the weld nugget 22, formed in the manner described hereinbefore, were allowed to cool, an ordinary weld nugget of constant diameter would be formed. Such a nugget would very likely have cracks and dimples causing weaknesses therein. In order to prevent this, cooling of the nugget is allowed to occur for a minimal time period which is sufficient only for the partial solidification of the weld nugget. Since heat is conducted away from the outer circumference of the nugget by virtue of contact with the surrounding areas of the workpieces 24, the outer portion 62 of the weld nugget is the first portion to solidify. An enlarged cross-sectional view of such a nugget is shown in FIG. 3.

After the outer portion 62 solidifies an arc is re-established between the electrode 42 and the central area of the nugget 22. This arc is maintained for a shorter period of time than the first arc to produce melting of only the center portion of the nugget. The arc is then terminated and a period of further cooling is allowed to permit the solidification of a ring portion 64 of nugget within the outer portion 62, as shown in FIG. 4. Immediately thereafter, the arc is again established for an even briefer period of time so as to melt only the very central portion 66 of the nugget 22.

Each time the arc is terminated, only a small circumferential area of the nugget is permitted to cool. Before cooling stresses can be set up, the central portion is remelted and again a small portion is allowed to cool. Since only a small portion of the nugget cools at a time, a minimum of stresses is induced in the nugget and cracking is thereby eliminated.

After a third establishment and termination of the arc, the welding apparatus is maintained in intimate contact with the surface 23 of the workpieces for a brief period of time to allow the center portion 66 to solidify while being surrounded by an inert atmosphere, thereby preventing contamination from the ambient atmosphere.

Generally, only one magnitude of current is utilized for all three cycles and the current is kept constant throughout each cycle. This practice is followed primarily to simplify the equipment and to reduce calculations of the required current. The amount of time which should be used for each weld, purge and cooling period varies with the type of material welded and the thickness thereof. Generally the purge and cooling periods are of several seconds duration each, the weld periods range from about one-tenth second to several seconds each; and the currents are of the order of magnitude of one to two hundred amperes for thin sheet workpieces of a moderately high temperature melting material. For example, it has been found that two sheets of .040-gauge stainless steel can be satisfactorily welded by using a 4-second purge, 1.84-second first heat (maintenance of an arc), 3.32-second first cool, 0.36-second second heat, 1.54-second second cool, 0.2-second third heat, and 4-second final cool and purge. The following table lists the various times and currents satisfactory for welding various thicknesses of titanium 75A alloy, for example.

In order to insure that welds will be of uniformly high quality, the welding and cooling cycles are generally automatically started and stopped. The machine includes controls which may be pre-set to start and stop the arc and to obtain the three heating cycles and the intermediate cooling intervals.

Various methods may be used to start the arc, including maintaining a radio frequency field around the electrode to ionize the atmosphere therein, utilizing a small pilot arc, using high current impulses of short duration at each commencement of the arc, and momentarily touching the electrode to the sheet. A radio frequency field is found to be a very simple and satisfactory method. This field may be continuously maintained for simplicity.

Generally, a machine for controlling the heating and cooling cycles includes electronic controls for setting the times of current flow, preventing arcing when it is undesirable, terminating the cycle, etc. Many types of systems may be used having various degrees of complexity. One such control system is shown in simplified form in FIG. 5. This system includes a radio frequency generator 100 suitably coupled to the system for ionizing the gas, a variable current source 102 which can be adjusted to provide the desired current, and a timer 104 for selectively energizing the system. The outputs of the RF generator 100 and source 102 are connected to the leads 30 and 32 in the assembly of FIG. 1.

The timer 104 is shown diagrammatically by way of example as including a motor driven wiper 106 which sequentially contacts each of three conducting plates 108, 110, and 112 to close a circuit which energizes the current source 102. Each plate may be adjustably positioned along radial slots 114 in a supporting plate 115 to alter the time of each heating period, and along circumferential slots 116 in each conducting plate to alter the time of the intervening cooling periods. The motor of the wiper 106 is energized when the relay 107 is closed. A last contact strip 116 is connected to the relay, and when contacted by the wiper 106, causes a current flow which opens the relay. The relay must then be closed by an operator in charge of the equipment in order to commence another welding cycle. In its simplest form the relay is of the type which is manually closed by the operator.

The copper cup 18 which serves as a heat sink to prevent excessive melting of the top sheet of material while allowing the bottom sheet to receive considerable heat, also serves several other purposes. This cup automatically spaces the electrode from the work, aids in establishing and controlling the inert gas envelope, serves as a means of applying pressure to the workpieces to maintain the desired intimate contact, and serves as a ground to apply one polarity of current to the workpiece. Although current is conducted to the workpieces through the cup 18 in the equipment illustrated, a separate electrode may be connected to the workpieces for carrying current thereto, and no current need be carried by the cup 18. It should be noted that the ports 20 in the cup 18 are not cut at the end of the cup which contacts the workpieces 24, as is usual in the case of ceramic cup envelopes used in prior equipment, but are spaced from the end. This construction serves to prevent a discontinuity in the annular heat sink afforded by the cup. If ports were established at the free end of the cup, local hot spots would occur at the areas of the cut away portions thus detracting from the desired uniform nature of the weld nugget.

In making a weld, the operator merely positions the cup 18 against the area on the sheet surface 23 where a weld is desired and then closes the relay 107. The relay controls the flow of current to the timer motor, and the timer controls the operation of the current source. The welding is then automatically accomplished in the manner described hereinbefore.

The surface of the workpieces should be reasonably clean prior to welding, though chemical cleanliness is not necessary for many metals. The faying or contacting surfaces of the parts to be welded need not be fitted together very tightly, for good weld nuggets have been obtained for sheet separations of up to .005 inch. Weld nuggets

WELD SEQUENCE IN SECONDS—TITANIUM 75A

| Thickness of Top Sheet, inch. | Thickness of Bottom Sheet, inch. | Pre-Weld Purge Period, sec. | Weld Period, sec. | No. 1 Cool Period, sec. | No. 1 Post Heat Period, sec. | No. 2 Cool Period, sec. | No. 2 Post Heat Period, sec. | No. 3 Cool Period, sec. | Current, amp. |
|---|---|---|---|---|---|---|---|---|---|
| .020 | .020 | 4.0 | 0.6 | 3.0 | 0.4 | 1.6 | 0.2 | 4.0 | 121 |
| .040 | .040 | 4.0 | 1.4 | 3.4 | 0.4 | 1.6 | 0.2 | 4.0 | 140 |
| .063 | .063 | 4.0 | 2.05 | 2.3 | 0.6 | 1.6 | 0.2 | 4.0 | 198 |
| .020 | .040 | 4.0 | 0.7 | 2.6 | 0.3 | 1.5 | 0.2 | 4.0 | 155 |
| .020 | .063 | 4.0 | 1.1 | 3.0 | 0.4 | 1.5 | 0.2 | 4.0 | 157 |
| .040 | .063 | 4.0 | 2.0 | 3.0 | 0.7 | 1.5 | 0.2 | 4.0 | 157 |
| .063 | .020 | 4.0 | 1.4 | 3.0 | 0.4 | 1.5 | 0.2 | 4.0 | 162 | formed using the present equipment have been found to have a greater diameter at the shear surfaces (the adjacent surfaces of the welded parts) than at the torch or back surfaces, thus actually providing a weld of greater strength than that provided by a nugget of uniform diameter.

The welding torch shown in FIG. 1 is a relatively simple type useful for light duty work. Many other types of torches, such as a gun type shown in Patent No. 2,673,278, may be used provided modifications in the cup surrounding the electrode tip are made so that the face of the cup is uninterrupted and any gas exhaust ports are spaced from the cup end.

Numerous alternative electrical control systems may be used to control the welding cycle, the described system being only an example of one possible system. Of course, the times of current flow and cooling are given only by way of example and may be varied, especially for different materials, thicknesses, size of desired weld, current magnitudes, and the particular welding equipment used.

Many modifications of the above described equipment and method may be made including the use of two or of more than three weld cycles, the use of various shapes of conducting cups and the arrangement of the various parts of the apparatus. Accordingly, it is desired to emphasize the face that many further modifications may be resorted to in a manner limited only by a just interpretation of the following claims:

We claim:

1. A method for producing a weld joint between adjacent workpieces comprising the steps of:
    establishing and maintaining an inert atmosphere over an area wherein a weld is to be produced;
    initiating an arc between a certain point on one of said workpieces and a positioned electrode;
    maintaining said arc at a substantially constant arc current for a first predetermined heat period;
    reducing said arc to allow said workpieces to cool for a predetermined cooling period;
    re-initiating and maintaining said arc at said point on said workpieces for a second predetermined heat period at a substantially constant arc current, said second heat period being of shorter duration than said first heat period;
    reducing said arc to allow said workpiece to cool for a second predetermined cooling period;
    re-initiating said arc at a substantially constant arc current after said second predetermined cooling period; and
    maintaining said arc for a third perdetermined heat period while said electrode is in the same position, said third heat period being of shorter duration than said second heat period.

2. A shielded arc welder comprising:
    a housing;
    welding-electrode holding means secured to said housing;
    a welding-electrode within said holding means;
    an insulating bushing disposed about said electrode holding means;
    a cup of conducting material disposed about said bushing, said cup having an end portion extending past said bushing and having gas exit ports formed therethrough and spaced from the end of said cup;
    at least two welding current leads, one of said leads disposed for connection to said electrode and another of said leads electrically connected to said cup, each of said leads being adapted for connection to a current source;
    gas passageway means mounted on said housing for carrying gas to the area encompassed by the end portion of said cup; and
    a current control means connected to said leads for producing a plurality of periods of current flow of progressively shorter duration, each period of current flow separated by a cooling period.

3. A shielded arc welder as defined in claim 2 including a radio frequency generator connected to said leads for maintaining a radio frequency electric field in the area encompassed by the end portion of said cup whereby arcs are readily initiated.

4. An arc spot welding method for weldably connecting at least two sheets, said method comprising the steps of:
    maintaining a circumferential heat sink in contact with a first surface of one of said sheets;
    establishing an arc of a predetermined current, said arc terminating on said first surface near a central area defined by said circumferential heat sink;
    maintaining said arc for a first predetermined time period to establish a molten weld nugget of generally circular cross section;
    permitting said nugget to cool for a sufficient cooling period whereby to solidify at least the radially outer portions thereof;
    re-establishing and maintaining said arc for a second predetermined time period, said second time period being minimally sufficient to obtain a molten nugget center of diameter smaller than that of the entire nugget;
    cooling the central area of said weld nugget for a minimal cooling period sufficient for the radially outer portions of said central area to solidify; and
    re-establishing said arc and maintaining it for a third predetermined time period minimally sufficient to melt an inner central area of weld nugget which is of a diameter smaller than the area melted by said arc during said second predetermined time period.

5. An arc spot welding method as defined in claim 4, wherein said first predetermined time period is at least about 0.6 second in duration, said second and third predetermined time periods are each at least one-tenth second duration and said cooling periods are at least one second duration each.

6. An arc spot welding method for welding at least two sheets together as defined in claim 4, including maintaining a radio-frequency electric field in the area within the boundaries of said heat sink before and at least until the establishment of each period of arc maintenance, whereby an arc is rapidly established and the duration of each period of arc maintenance is accurately controlled.

7. An arc spot welding method comprising the steps of:
    maintaining a circumferential heat sink in contact with a part to be welded;
    establishing an arc within said heat sink for a predetermined time interval; and
    thereafter producing a plurality of progressively shorter duration periods of cooling and maintaining an arc to obtain molten nugget centers of successively smaller diameters.

References Cited

UNITED STATES PATENTS

| | | | |
|---|---|---|---|
| 2,550,495 | 4/1951 | Pilia | 219—127 |
| 2,922,023 | 1/1960 | Hackman et al. | 219—127 |
| 3,015,022 | 12/1961 | Bowers | 219—127 |
| 3,102,948 | 9/1963 | McCampbell | 219—137 |
| 3,118,051 | 1/1964 | Dixon | 219—137 |
| 3,132,240 | 5/1964 | McCartney | 219—127 |
| 3,138,694 | 6/1964 | Sikorski | 219—127 |
| 3,148,266 | 9/1964 | Bichsel et al. | 219—137 |

RICHARD M. WOOD, *Primary Examiner.*

W. D. BROOKS, *Assistant Examiner.*